United States Patent
Chen et al.

(10) Patent No.: US 10,320,741 B2
(45) Date of Patent: Jun. 11, 2019

(54) SERVER IP ADDRESS ASSIGNMENT SYSTEM AND METHOD

(71) Applicant: HONGFUJIN PRECISION ELECTRONICS (TIANJIN) CO., LTD., Tianjin (CN)

(72) Inventors: Po-Jung Chen, New Taipei (TW); Jiing-Shyang Jang, New Taipei (TW)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 194 days.

(21) Appl. No.: 15/387,825

(22) Filed: Dec. 22, 2016

(65) Prior Publication Data

US 2018/0145943 A1 May 24, 2018

(30) Foreign Application Priority Data

Nov. 22, 2016 (CN) .......................... 2016 1 1035676

(51) Int. Cl.
*H04L 29/12* (2006.01)
*H04L 29/08* (2006.01)

(52) U.S. Cl.
CPC ........ *H04L 61/2015* (2013.01); *H04L 67/101* (2013.01); *H04L 67/28* (2013.01)

(58) Field of Classification Search
CPC ............. H04L 61/2015; H04L 61/2038; H04L 61/2061; H04L 61/609; H04L 67/101; H04L 67/28; H04L 29/12283
USPC ......................................................... 709/245
See application file for complete search history.

(56) References Cited

U.S. PATENT DOCUMENTS

| | | | | |
|---|---|---|---|---|
| 6,957,276 B1* | 10/2005 | Bahl | .................. | H04L 61/2015 709/226 |
| 7,577,725 B1* | 8/2009 | Sitaraman | ........... | H04L 12/2872 709/219 |
| 2005/0253722 A1* | 11/2005 | Droms | ............... | G08B 13/2402 340/572.1 |
| 2008/0034077 A1* | 2/2008 | Takashige | .............. | G06Q 10/06 709/223 |
| 2009/0279454 A1* | 11/2009 | Wacker | ............. | H04L 29/12283 370/255 |

(Continued)

OTHER PUBLICATIONS

Eric Geier, "Using Static IP Addresses on Your Network", Sep. 2009, CISCO, www.ciscopress.com/articles/printerfriendly/1393495 (Year: 2009).*

*Primary Examiner* — Ruolei Zong
(74) *Attorney, Agent, or Firm* — ScienBiziP, P.C.

(57) ABSTRACT

A server IP address assignment system which can automatically assign IP address for servers includes a data center management system (DCMS) server, a dynamic host configuration protocol (DHCP) server, a plurality of switches, and a plurality of servers. The DCMS server obtains a location table of the servers and the switches based upon initial data center construction details, and assigns an IP address to each of the servers, the location table with these assignments is then transmitted to the DHCP server. The server transmits a DHCP packet to the switch, and the switch adds an Option82 message into the DHCP packet and transmits an added DHCP packet to the DHCP server. The DHCP server analyzes the Option82 message of the DHCP packet to obtain the IP address and assigns the IP address to the server. A server IP address assignment method is also provided.

15 Claims, 4 Drawing Sheets

(56) References Cited

U.S. PATENT DOCUMENTS

2017/0052795 A1* 2/2017 Kashyap ............... G06F 9/4416

* cited by examiner

SERVER IP ADDRESS ASSIGNMENT SYSTEM AND METHOD

FIELD

The subject matter herein generally relates to a system and method for assigning (internet protocol) IP address to the servers.

BACKGROUND

A datacenter comprises hundreds of servers, each of the servers need to be assigned an IP address. Administrator takes a lot of time and energy to assign the IP addresses of the servers.

BRIEF DESCRIPTION OF THE DRAWINGS

Implementations of the present technology will now be described, by way of example only, with reference to the attached figures.

DETAILED DESCRIPTION

Figure 1:
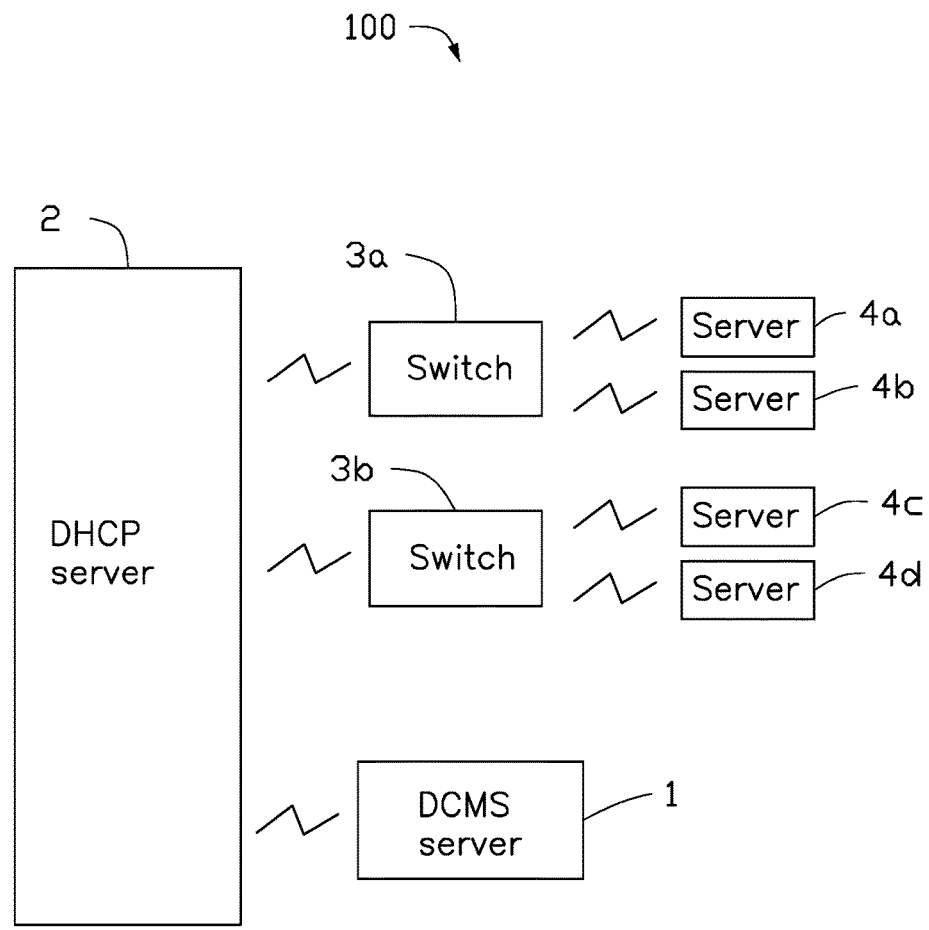
FIG. 1 is a diagram of an exemplary embodiment of a server IP address assignment system.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure. It should be noted that references to "an" or "one" exemplary embodiment in this disclosure are not necessarily to the same exemplary embodiment, and such references mean "at least one."

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
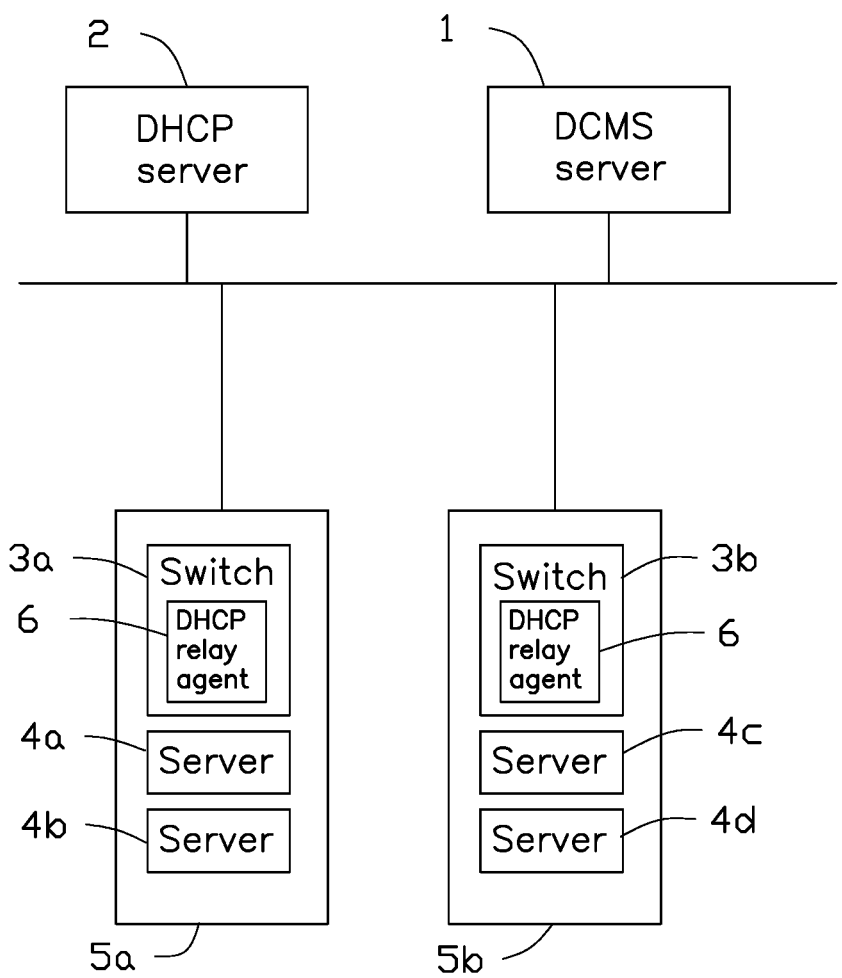
FIG. 2 is a block diagram of an exemplary embodiment of the server IP address assignment system.

FIGS. 1, 2 illustrate a server internet protocol (IP) address assignment system 100 in accordance with an exemplary embodiment.

The server IP address assignment system 100 comprises a data center management system (DCMS) server 1, a dynamic host configuration protocol (DHCP) server 2, a plurality of switches, and a plurality of servers.

In one exemplary embodiment, the plurality of switches comprises two switches 3a and 3b, and the plurality of servers comprises four servers, 4a to 4d. The servers 4a and 4b are electronically coupled to the switch 3a. The servers 4c and 4d are electronically coupled to the switch 3b. The servers 4a and 4b and the switch 3a can be installed on a first rack 5a. The servers 4c and 4d and the switch 3b can be installed on a second rack 5b.

In one exemplary embodiment, each of the racks 5a and 5b comprises a plurality of holding units (not shown), and each of the holding units is configured to house a server or a switch.

In one exemplary embodiment, the DCMS server 1 can manage the plurality of servers 4a to 4d. For example, the DCMS server 1 can monitor the running status of each of the servers 4a to 4d. The DCMS server 1 also can obtain a log file of each of the servers 4a to 4d.

The DCMS server 1 is configured to obtain and store a location table of the servers 4a to 4d, and the switches 3a and 3b.

In one exemplary embodiment, when a datacenter is installed, a network cabling rule of the servers 4a to 4d and the switches 3a and 3b can be preset as a location table. The DCMS server 1 can obtain server location information and connection information as to servers and switches from the location table.

In one exemplary embodiment, the location table is as below:

| Rack ID | Holding unit ID | Switch ID | Port ID | Server ID |
|---|---|---|---|---|
| 1 | 1 | 1 | 0/1 | 1 |
| 1 | 2 | 1 | 0/2 | 2 |
| 2 | 1 | 2 | 0/1 | 3 |
| 2 | 2 | 2 | 0/2 | 4 |

In the exemplary location table, a server ID of the server 4a is 1, a server ID of the server 4b is 2, a server ID of the server 4c is 3, and a server ID of the server 4d is 4. A switch ID of the switch 3a is 1 and a switch ID of the switch 3b is 2. A rack ID of the first rack 5a is 1 and a rack ID of the second rack 5b is 2. According to the location table, the server 4a is installed on holding unit number 1 of the first rack 5a, and the server 4a is coupled to port number 0/1 of the switch 3a. The server 4d is installed on a holding unit number 2 of the second rack 5b, and the server 4d is coupled to port number 0/2 of the switch 3b.

The DCMS server 1 can assign an IP address to each of the servers 4a to 4d in the location table through a management interface. A unique IP address is assigned to each of the servers 4a to 4d. The DCMS server 1 is further configured to transmit a location table with these assignments (assigned location table) to the DHCP server 2.

In one exemplary embodiment, the assigned location table is as below:

| Rack ID | Holding unit ID | Switch ID | Port ID | Server ID | IP address |
|---|---|---|---|---|---|
| 1 | 1 | 1 | 0/1 | 1 | 192.168.1.11 |
| 1 | 2 | 1 | 0/2 | 2 | 192.168.1.12 |

| Rack ID | Holding unit ID | Switch ID | Port ID | Server ID | IP address |
|---------|-----------------|-----------|---------|-----------|--------------|
| 2 | 1 | 2 | 0/1 | 3 | 192.168.1.13 |
| 2 | 2 | 2 | 0/2 | 4 | 192.168.1.14 |

In the assigned location table, the assigned IP address of server 4a is 192.168.1.11, the assigned IP address of server 4b is 192.168.1.12, the assigned IP address of server 4c is 192.168.1.13, and the assigned IP address of server 4d is 192.168.1.14.

In one exemplary embodiment, the DCMS server 1 is further configured to manage the assigned location table according to an Option82 format requirement and transmit a managed location table to the DHCP server 2.

In one exemplary embodiment, the managed location table is as below:

| Switch ID | Port ID | IP address |
|-----------|---------|--------------|
| 1 | 0/1 | 192.168.1.11 |
| 1 | 0/2 | 192.168.1.12 |
| 2 | 0/1 | 192.168.1.13 |
| 2 | 0/2 | 192.168.1.14 |

When the server 4a comes online, the server 4a transmits a DHCP packet to the switch 3a to request assignment of the IP address. The switch 3a adds an Option82 message into the DHCP packet and transmits the DHCP packet comprising the Option82 message to the DHCP server 2. The DHCP server 2 analyzes the Option82 message of the DHCP packet to obtain the IP address of the server 4a and assigns the IP address to the server 4a.

In one exemplary embodiment, the Option82 message is a DHCP relay agent information option. The DHCP server 2 analyzes the Option82 message of the DHCP packet and looks up the managed location table to obtain the IP address of the server 4a. The IP address of the server 4a is 192.168.1.11.

In one exemplary embodiment, the switch 3a comprises a DHCP relay agent 6, and the switch 3a adds the Option82 message into the DHCP packet through the DHCP relay agent 6.

After the DHCP server 2 assigns the IP address to the server 4a, the DCMS server 1 is further configured to communicate with the IP address (server 4a) and determine whether the IP address outputs a response. If the IP address outputs the response, the DCMS server 1 is further configured to add the IP address into a managed list. Then, the DCMS server 1 can manage the server 4a. If DCMS server 1 does not receive a response from the IP address, the DCMS server 1 repeatedly issues queries for the response at set intervals. For example, the DCMS server 1 repeatedly issues queries for the response once in every minute.

Detailed descriptions and configurations of the server 4b, the server 4c, and the server 4d, being substantially the same as for those of the server 4a, are omitted.

Figure 3:
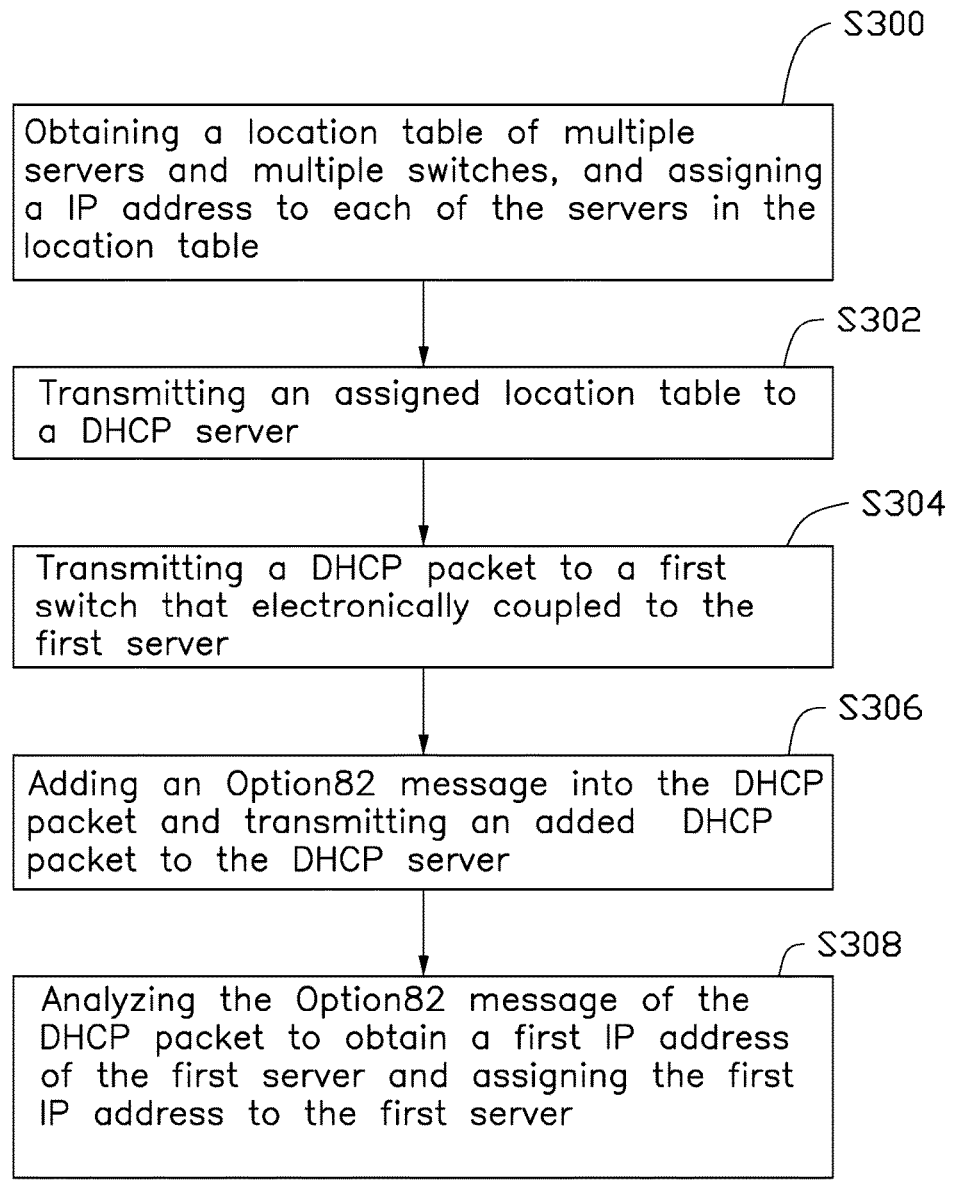
FIG. 3 is a flow diagram of a first exemplary embodiment of a method of a server IP address assignment.

FIG. 3 illustrates an exemplary embodiment of a server IP address assignment method. The flowchart presents an exemplary embodiment of the method. The example method is provided by way of example, as there are a variety of ways to carry out the method. The method described below can be carried out using the configurations illustrated in FIG. 1-FIG. 2, for example, and various elements of these figures are referenced in explaining the example method. Each step shown in FIG. 3 represents one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step S300.

In step S300, the DCMS server 1 obtains the location table of the servers 4a to 4d and the switches 3a and 3b, and assigns the IP address to each of the servers 4a to 4d in the location table.

In step S302, the DCMS server 1 transmits the assigned location table to the DHCP server 2.

In step S304, the server 4a transmits the DHCP packet to the switch 3a in response to the server 4a coming online.

In step S306, the switch 3a adds the Option82 message into the DHCP packet and transmits the added DHCP packet to the DHCP server 2.

In step S308, the DHCP server 2 analyzes the Option82 message of the DHCP packet to obtain the IP address of the first server 4a and assigns the IP address to the first server 4a.

In one exemplary embodiment, the DCMS server 1 further manages the assigned location table according to the Option82 format requirement and transmit the managed location table to the DHCP server 2.

In one exemplary embodiment, the switch 3a adds the Option82 message into the DHCP packet through the DHCP relay agent 6. The DHCP server 2 analyzes the Option82 message of the DHCP packet and look ups the managed location table to obtain the IP address of the server 4a.

Figure 4:
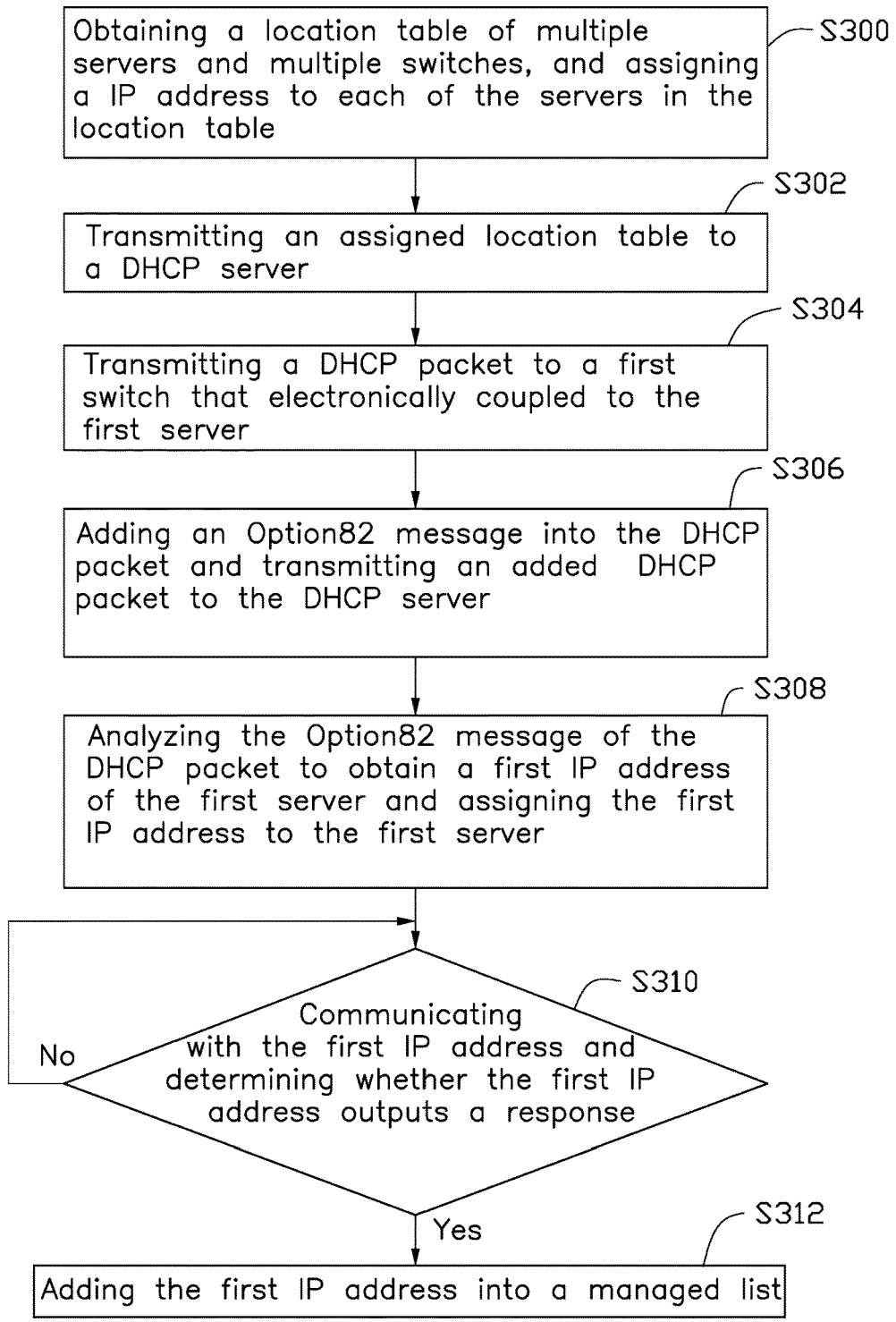
FIG. 4 is a flow diagram of a second exemplary embodiment of the method of the server IP address assignment.

Referring to FIG. 4, the method further comprises step S310 and step S312.

In step S310, the DCMS server 1 communicates with the IP address of the server 4a and determines whether the IP address of the server 4a outputs the response.

In step S312, if the DCMS server 1 receives the response, the DCMS server 1 adds the IP address of the server 4a into the managed list. If the DCMS server 1 does not receive the response, repeats step S310.

The exemplary embodiments shown and described above are only examples. Many details are often found in the art such as the other features of a device monitoring system and method. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A server internet protocol (IP) address assignment method comprising:
    obtaining a location table of multiple servers and multiple switches, and assigning an IP address to each of the servers in the location table;
    transmitting an assigned location table to a dynamic host configuration protocol (DHCP) server;
    transmitting a DHCP packet to a first switch that electronically coupled to a first server;
    adding an Option82 message into the DHCP packet and transmitting an added DHCP packet to the DHCP server; and analyzing the Option82 message of the DHCP packet to obtain the IP address of the first server from the assigned location table, and assigning the IP address to the first server.

2. The server IP address assignment method of claim 1, wherein the step of transmitting an assigned location table to a DHCP server comprises:
managing an assigned location table according to an Option82 format requirement; and
transmitting a managed location table to a DHCP server.

3. The server IP address assignment method of claim 1, wherein the step of adding an Option82 message into the DHCP packet comprises:
adding an Option82 message into the DHCP packet through a DHCP relay agent.

4. The server IP address assignment method of claim 1, wherein when the first server comes online, the first server transmits the DHCP packet to the first switch to request assignment of the IP address.

5. The server IP address assignment method of claim 1, wherein the step of analyzing the Option82 message of the DHCP packet to obtain the IP address of the first server from the assigned location table comprises:
analyzing the Option82 message of the DHCP packet and looking up the assigned location table to obtain the IP address of the first server.

6. The server IP address assignment method of claim 1, further comprising:
communicating with the IP address and determining whether the IP address outputs a response; and
adding the IP address into a managed list in response to receiving the response from the IP address.

7. The server IP address assignment method of claim 1, wherein each of the servers is assigned a unique IP address.

8. A server IP address assignment system comprising:
a data center management system (DCMS) server obtaining a location table of multiple servers and multiple switches, assigning an IP address to each of the servers in the location table, and transmitting an assigned location table to a DHCP server, wherein the DCMS server is coupled to the multiple servers and the multiple switches, the DCMS server is further coupled to the DHCP server, and the DHCP server is coupled to the multiple servers and the multiple switches;
a first server transmitting a DHCP packet to a first switch that coupled to the first server;
the first switch adding an Option82 message into the DHCP packet and transmitting an added DHCP packet to the DHCP server; and
the DHCP server analyzing the Option82 message of the DHCP packet to obtain the IP address of the first server from the assigned location table, and assigning the IP address to the first server.

9. The server IP address assignment system of claim 8, wherein the DCMS server further manages the assigned location table according to an Option82 format requirement and transmits a managed location table to the DHCP server.

10. The server IP address assignment system f claim 8, wherein the first switch comprises a DHCP relay agent, and the first switch adds the Option82 message into the DHCP packet through the DHCP relay agent.

11. The server IP address assignment system of claim 8, wherein when the first server comes online, the first server transmits the DHCP packet to the first switch to request assignment of the IP address.

12. The server IP address assignment system of claim 8, wherein the DHCP server analyzes the Option82 message of the DHCP packet and look ups the assigned location table to obtain the IP address of the first server.

13. The server IP address assignment system of claim 8, wherein the DCMS server further communicates with the IP address and determines whether the IP address outputs a response; and the DCMS server further adds the IP address into a managed list in response to receiving the response from the IP address.

14. The server IP address assignment system of claim 13, wherein when the DCMS server does not receive the response from the IP address, the DCMS server repeatedly issues queries for the response once at set intervals.

15. The server IP address assignment system of claim 8, wherein each of the servers is assigned a unique IP address.

\* \* \* \* \*